United States Patent [19]

Oellerich

[11] 4,317,870
[45] Mar. 2, 1982

[54] BATTERY TERMINATION STRUCTURE
[75] Inventor: Bruce A. Oellerich, Algonquin, Ill.
[73] Assignee: Gould Inc., Rolling Meadows, Ill.
[21] Appl. No.: 209,629
[22] Filed: Nov. 24, 1980
[51] Int. Cl.³ ............................................. H01M 2/26
[52] U.S. Cl. .................................... 429/161; 429/178
[58] Field of Search .......................... 429/161, 178–184
[56] References Cited

U.S. PATENT DOCUMENTS 3,640,775  2/1972  Fitchman et al. ..................... 429/161
3,928,079  12/1975  Jennings et al. ..................... 429/179
4,207,390  6/1980  Oehrlein et al. ..................... 429/179

Primary Examiner—Charles F. LeFevour
Attorney, Agent, or Firm—Augustus J. Hipp

[57] ABSTRACT

A battery termination structure wherein a connector post is mounted to the battery case in such a manner as to permit clamping of an electrical connector element, such as a ring tongue connector, to the post without substantial clamping strain transmission to the battery case. The connector post is retained in a recess provided in the case by an inturned retainer at the outer end of the recess which serves to prevent withdrawal of the assembly from the recess. The connector post is associated with the case so as to prevent rotation thereof as during connection of the electrical connector element to the post.

12 Claims, 3 Drawing Figures

BATTERY TERMINATION STRUCTURE

DESCRIPTION

TECHNICAL FIELD

This invention relates to electrical batteries and in particular to termination structures for use therein.

DESCRIPTION OF THE BACKGROUND ART

It has been conventional to provide in storage batteries exposed terminals which are mounted to a portion of the case of the battery. The terminals are connected by suitable wires or other electrical conducting elements to the internal components of the battery within the case. The terminals conventionally define an outer portion exposed for connection thereto of battery cables and the like.

One such storage battery structure is illustrated in U.S. Pat. No. 793,117 of T. S. Witherbee. As shown therein, the terminal is mounted to the cover of the battery case and includes a wing nut which is threaded to a threaded stud portion extending through the battery case. Such a structure has the obvious disadvantage of permitting cracking of the battery case where the wing nut is tightened excessively on the threaded element.

In U.S. Pat. No. 852,424 of Thomas Alva Edison, a battery is shown to include terminals which are similarly mounted to the cover portion of the battery case.

Paul M. Marko shows, in U.S. Pat. No. 1,175,651, a terminal connector shown having an eye into which a stud from the interior of the battery extends through the cover of the battery, with the stud and eye being welded together in the assembled arrangement.

In U.S. Pat. No. 3,767,467 of James H. Miller et al., which patent is owned by the assignee hereof, a battery side terminal is disclosed having a head portion received in a ring molded on the sidewall of the battery case. The head portion is prevented from rotation by interengaging lugs.

In German Pat. No. 27 15 271, a stud is fixed to a metal plate by riveting over the edge of a portion of the stud extending through a hole in the plate so as to cooperate with a head of the stud on the opposite side of the plate in securing the screw thereto.

DISCLOSURE OF THE INVENTION

The present invention comprehends an improved battery termination structure wherein a connector post is secured to a portion of the battery case in such a manner as to effectively preclude transmission of stress forces to the battery case during connection of an electrical connector element to the terminal connector post.

More specifically, the invention comprehends providing such a connector post within a recess provided in the battery case in association with a wire connector, a retaining collar, and a clamp element whereby substantially all clamping forces generated in connecting the electrical connector to the terimnation structure are directed between the clamp element and the head portion of the connector post substantially without stress on the battery case.

In the illustrated embodiment, the termination structure includes means on the case defining an outwardly opening recess, means on the case at the outer end of the recess defining an inturned retainer, a connector post having an inner head portion fitted in an inner portion of the recess to be retained against rotation therein, and a shank portion extending axially from the head portion to outwardly of said recess, a wire connector having a lug portion received in the recess and inwardly engaging the head portion of the connector post, the wire connector further having a wire connecting portion extending inwardly through the case for use in providing an electrical wire connection within the battery, a retaining collar received in the recess inwardly engaging the wire connector lug portion, and having a portion engaged by the inturned retainer, and a clamp element secured to the connector post shank portion for clamping an electrical connector element disposed between the clamp element and the retaining collar forcibly against the retaining collar, and in turn sequentially forcibly urging the retaining collar against the lug portion of the wire connector and the lug portion against the head portion of the connector post, whereby substantially all clamping forces generated in connecting the electrical connector to the termination structure are directed between the clamp element and connector post head portion substantially without stress on the battery case.

More specifically, in the illustrated embodiment, the termination structure is defined by means on the case defining an outwardly opening recess having an inner noncircular cross section portion, an intermediate portion having a transverse dimension greater than that of the inner portion, and an outer portion having a transverse dimension greater than that of the intermediate portion, means on the case at the outer end of the recess outer portion defining an inturned retainer, a connector post defining an axis and having an inner head portion fitted in the inner portion of the recess to be retained against rotation about the axis, and a shank portion extending axially outwardly from the head portion through the intermediate and outer portions of the recess, the outer distal end of the shank portion being threaded and disposed outwardly of the outer portion of the recess, a wire connector having a lug portion received in the intermediate portion of the recess and inwardly engaging the head portion of the connector post, the connector post extending outwardly through the lug portion, the wire connector further having a wire connecting portion extending inwardly through the case for use providing an electrical wire connection within the battery, a retaining collar received in the recess outer portion having an inner portion inwardly engaging the wire connector lug portion, an intermediate portion retained against outward displacement from the recess outer portion by the inturned retainer, and an outer portion defining an outwardly facing distal surface, and a clamp element threaded to the threaded distal end of the connector post shank portion for clamping an electrical connector element disposed between the clamp element and the outwardly facing distal surface of the retaining collar outer portion forcibly against the outwardly facing distal surface, and in turn sequentially forcibly urging the retaining collar against the lug portion of the wire connector and the lug portion against the head portion of the connector post, whereby substantially all clamping forces generated in connecting the electrical connector to the termination structure are directed between the clamp element and connector post head portion substantially without stress on the battery case.

The termination structure of the present invention is extremely simple and economical of construction while yet providing an improved structure for connecting an electrical connector element to the battery providing substantial clamping forces to be applied in effecting a positive, mechanical and electrical connection to the battery post while avoiding undesirable stresses on the battery case to which the connector post is mounted.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
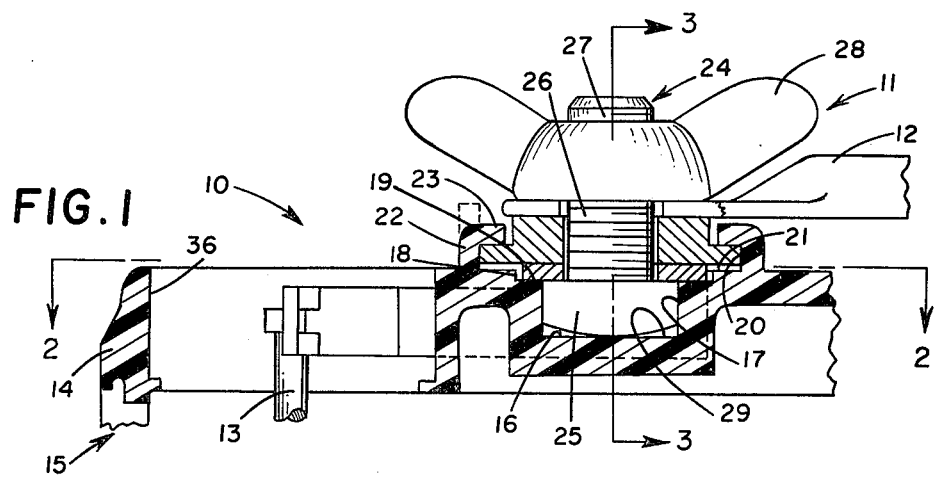
FIG. 1 is a fragmentary vertical section illustrating a termination structure embodying the invention.

In the exemplary embodiment of the invention as disclosed in the drawing, a battery means generally designated 10 is shown to include a termination structure generally designated 11 for use in connecting an electrical connector element 12 to the internal structure of the battery as through a wire 13 thereof. Termination structure 11 is mounted to a portion of the cover 14 of the battery case generally designated 15.

The case cover defines an outwardly opening recess generally designated 16 having an inner, noncircular cross section portion 17, an intermediate portion 18 having a transverse dimension greater than that of the inner portion to define therebetween an outwardly facing inner shoulder 19, and an outer portion 20 having a transverse dimension greater than that of the intermediate portion 18 to define therebetween an outwardly facing outer shoulder 21.

As best seen in FIG. 1, outer recess portion 20 is effectively defined by an upstanding annular wall 22 on cover 14, having a distal portion 23 which is deflectible from an upright position shown in broken lines in FIG. 1 to an inturned position, as shown in full lines therein.

The termination structure 11 further defines a connector post generally designated 24 having a head portion 25 received in inner portion 17 of the recess. Extending axially outwardly from head portion 25 is a shank portion 26 having an outer, distal end 27 which is threaded to receive a wing nut 28.

Inner recess portion 17 defines a noncircular cross section, and in the illustrated embodiment, defines a polygonal cross section for fitted reception of a complementary polygonal cross section head portion 25, thereby to provide means for preventing rotation of the connector post as during threaded rotation of the wing nut 28 thereon. As shown in FIG. 1, head portion 25 engages the bottom 29 of recess 16 in the installed arrangement of the termination structure.

Figure 2:
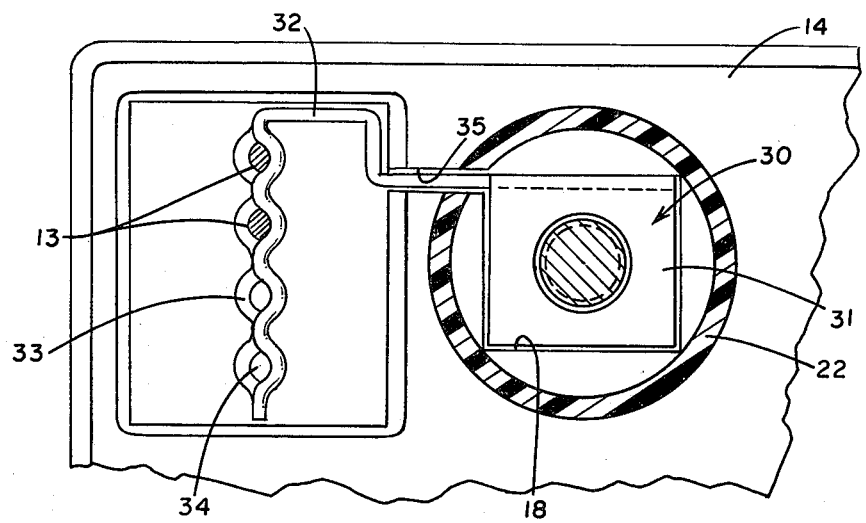
FIG. 2 is a fragmentary horizontal section thereof taken substantially along the line 2-2 of FIG. 1.

The termination structure further includes a wire connector generally designated 30, having a lug portion 31 received in recess intermediate portion 18. As best seen in FIG. 2, the wire connector includes a wire connector 32 having a wire connection portion 33 defining a plurality of wire-receiving slots 34 for receiving internal wires, such as wire 13 of the battery. As shown, wire connecting portion 32 extends through a slot 35 extending between the recess 16 and an opening 36 in the cover 14 spaced adjacent recess 16. Conventionally, after the wires 13 are connected to the wire connector, as illustrated in FIG. 1, the opening 36 may be suitably sealed.

Figure 3:
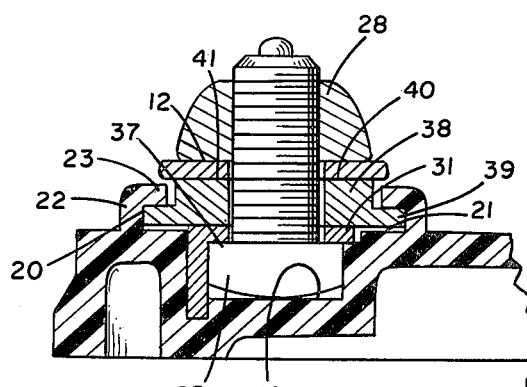
FIG. 3 is a fragmentary vertical section taken substantially along the line 3—3 of FIG. 1.

As illustrated in FIGS. 1 and 3, lug portion 31 of the wire connector engages an outwardly facing surface 37 on connector post head portion 25. Lug portion 31 is forcibly urged against surface 37 by a retaining collar generally designated 38, which is received in the outer portion 20 of recess 16. Retaining collar 38 defines an inner radially outwardly extending flange portion 39 which is received between the turned distal end 23 of wall 22 and the outwardly facing surface 21 at the inner end of recess portion 20. As shown in FIG. 3, the axial thickness of flange 39 is less than the spacing between inturned wall portion 23 and surface 21 and, thus, retainer wall portion 23 serves solely to prevent outward movement of the retaining collar from the recess outer portion.

The outer end 40 of retaining collar 38 extends to outwardly of the recess portion 20 and, more specifically, as seen in FIG. 3, to outwardly of the inturned wall portion 23. The electrical connecting element 12, in the illustrated embodiment, comprises a ring tongue connector which is clamped against the outer surface 41 of retainer collar 38 by the wing nut 28 when the wing nut is threadedly tightened on the connecting post shank 26. It should be noted that such tightening causes the forcible clamping of the electrical connector element 12 to the retaining collar 38 and, turn, urges the retaining collar forcibly against lug 31 of wire connector 30 and, in turn, urge the wire connector against the connector post head shoulder 37. Thus, all of the clamping forces are generated on the connecting post rather than against the case 15, thereby effectively preventing cracking and other deformation of the case from such forces. The retention of retaining collar flange 39 by the inturned retaining means 23 co-operates with the bottoming of the connector post head portion 25 on bottom surface 29 of recess 16 in retaining the termination structure in the assembled disposition of FIG. 1.

In the illustrated embodiment, case cover 14 is formed of a thermoplastic synthetic resin and, thus, the wall 22 is deflectible by suitable heated deflecting means. As the cover may be readily formed by low cost molding operations, the arrangement of recess 16, slot 35 and opening 36 may be readily accurately coordinated to provide the desired facilitated and accurate termination structure assembly.

Thus, termination structure 11 provides for facilitated positive mechanical and electrical connection of the electrical conductor element 12 to the battery structure. A strong mechanical connection may be readily effected with minimum effort and with minimum transfer of stresses to the battery case.

The foregoing disclosure of specific embodiments is illustrative of the broad inventive concepts comprehended by the invention.

I claim:

1. In a battery having a case, a termination structure comprising:

means on said case defining an outwardly opening recess;

means on said case at the outer end of said recess defining an inturned retainer;

a connector post having an inner head portion fitted in an inner portion of the recess to be retained against rotation therein, and a shank portion extending axially from said head portion to outwardly of said recess;

a wire connector having a lug portion received in said recess and inwardly engaging said head portion of the connector post, said wire connector further having a wire connecting portion extending inwardly through said case for use in providing an electrical wire connection within the battery;

a retaining collar received in said recess inwardly engaging said wire connector lug portion, and having a portion engaged by said inturned retainer; and a clamp element secured to said connector post shank portion for clamping an electrical connector element disposed between said clamp element and said retaining collar forcibly against said retaining collar, and in turn sequentially forcibly urging the retaining collar against said lug portion of the wire connector and the lug portion against the head portion of the connector post, whereby substantially all clamping forces generated in connecting the electrical connector to the termination structure are directed between said clamp element and connector post head portion substantially without stress on the battery case.

2. The battery structure of claim 1 wherein said retainer means comprises an annular wall upstanding from said case and having an inturned outer distal end.

3. The battery structure of claim 1 wherein said retainer is positioned on said case to retain the assembled connector post, wire connector, and retaining collar against movement outwardly from said recess.

4. The battery structure of claim 1 wherein said connector post head portion is retained against the bottom of said recess as a result of said retainer engaging said retaining collar.

5. The battery structure of claim 1 wherein said recess means defines means for cooperating with said connector post head portion in preventing rotation of the connector post about the longitudinal axis of the post.

6. In a battery having a case, a termination structure comprising:

means on said case defining an outwardly opening recess having an inner noncircular cross section portion, an intermediate portion having a transverse dimension greater than that of said inner portion, and an outer portion having a transverse dimension greater than that of said intermediate portion; means on said case at the outer end of said recess outer portion defining an inturned retainer;

a connector post defining an axis and having an inner head portion fitted in said inner portion of the recess to be retained against rotation about said axis, and a shank portion extending axially outwardly from said head portion through said intermediate and outer portions of the recess, the outer distal end of the shank portion being threaded and disposed outwardly of said outer portion of the recess;

a wire connector having a lug portion received in said intermediate portion of the recess and inwardly engaging said head portion of the connector post, said connector post extending outwardly through said lug portion, said wire connector further having a wire connecting portion extending inwardly through said case for use in providing an electrical wire connection within the battery;

a retaining collar received in said recess outer portion having an inner portion inwardly engaging said wire connector lug portion, an intermediate portion retained against outward displacement from said recess outer portion by said inturned retainer, and an outer portion defining an outwardly facing distal surface; and a clamp element threaded to said threaded distal end of the connector post shank portion for clamping an electrical connector element disposed between said clamp element and said outwardly facing distal surface of the retaining collar outer portion forcibly against said outwardly facing distal surface, and in turn sequentially forcibly urging the retaining collar against said lug portion of the wire connector and the lug portion against the head portion of the connector post, whereby substantially all clamping forces generated in connecting the electrical connector to the termination structure are directed between said clamp element and connector post head portion substantially without stress on the battery case.

7. The battery structure of claim 6 wherein said means defining the outer portion of the recess comprises a peripheral upstanding wall and said inturned retainer means comprises an inturned distal end of said wall.

8. The battery structure of claim 6 wherein said head portion of the connector post and the inner portion of the recess define a polygonal cross section.

9. The battery structure of claim 6 wherein said lug portion of the wire connector and said intermediate portion of the recess define a polygonal cross section.

10. The battery structure of claim 6 wherein said means defining the outer portion of the recess comprises an annular wall and said inturned retainer means comprises an inturned distal end of said wall.

11. The battery structure of claim 6 wherein said means defining said recess defines between said inner and intermediate portion of the recess an outwardly facing shoulder and said retainer collar between said inturned retainer and said shoulder has an axial thickness less than the axial spacing between said inturned retainer and said shoulder.

12. The battery structure of claim 6 wherein said means defining the outer portion of the recess comprises a peripheral upstanding wall and said inturned retainer means comprises a deformable distal end of said wall inturned to overlie said retaining collar subsequent to the disposition of the retaining collar in said recess outer portion.

* * * * *